(12) United States Patent
Malaker (10) Patent No.: US 9,458,610 B2
(45) Date of Patent: Oct. 4, 2016

(54) PLUMBING CONNECTOR

(71) Applicant: Homewerks Worldwide, LLC, Lincolnshire, IL (US)

(72) Inventor: Michael Malaker, Gurnee, IL (US)

(73) Assignee: Homewerks Worldwide, LLC, Lincolnshire (IL)

( * ) Notice: Subject to any disclaimer, the term of this patent is extended or adjusted under 35 U.S.C. 154(b) by 126 days.

(21) Appl. No.: 14/466,429

(22) Filed: Aug. 22, 2014

(65) Prior Publication Data

US 2015/0354181 A1    Dec. 10, 2015

Related U.S. Application Data

(60) Provisional application No. 62/010,376, filed on Jun. 10, 2014.

(51) Int. Cl.
*E03C 1/02*    (2006.01)
*F16B 31/02*    (2006.01)

(52) U.S. Cl.
CPC ............ *E03C 1/021* (2013.01); *F16B 31/024* (2013.01); *Y10T 137/9029* (2015.04)

(58) Field of Classification Search
CPC .......... E04C 1/21; E04C 1/021; E03D 1/32; F16L 15/00; F16L 35/00; F16B 31/024; Y10T 137/9029

USPC .................................................. 285/2–4, 386
See application file for complete search history.

(56) References Cited

U.S. PATENT DOCUMENTS

| | | | | |
|---|---|---|---|---|
| 3,343,443 | A | * | 9/1967 | Moore .................. F16B 19/083 29/432 |
| 3,444,775 | A | * | 5/1969 | Hills ..................... F16B 31/021 411/3 |
| 3,691,897 | A | * | 9/1972 | Mullaney .............. F16B 31/024 411/8 |
| 4,253,686 | A | * | 3/1981 | Aitken ..................... F16L 47/04 285/249 |
| D282,818 | S | * | 3/1986 | Bos ........................ F16B 33/006 D8/382 |
| 5,549,432 | A | * | 8/1996 | Reneau .................. F16B 33/006 285/38 |

(Continued)

*Primary Examiner* — Beth Stephan
(74) *Attorney, Agent, or Firm* — Cozen O'Connor (57) ABSTRACT

A plumbing connector for the outlet portion of a toilet water input hose is disclosed. The plumbing connector may have a circular body (e.g., cylindrical body) having multiple flanges radially extending from the circular body. One or more of the flanges may each define at least one pyramidal recess or slot thereby reducing the cross-sectional area of a portion of each of the one or more flanges. As a result, the one or more flanges are configured to separate (e.g., break away) from the circular body at the reduced cross-sectional area portion of each of the one or more flanges to prevent a user from over-tightening (e.g., over-torqueing) the plumbing connector.

19 Claims, 6 Drawing Sheets

(56) References Cited

U.S. PATENT DOCUMENTS

| | | | | |
|---|---|---|---|---|
| 6,604,882 B2 * | 8/2003 | Gordon | F16G 11/00 24/122.6 |
| D479,585 S * | 9/2003 | Mulligan | F16B 33/006 D23/259 |
| 6,974,162 B2 * | 12/2005 | Chelchowski | F16L 47/04 285/322 |
| D558,306 S * | 12/2007 | McCluskey | D23/264 |
| 7,455,328 B2 * | 11/2008 | Chelchowski | F16L 19/086 285/247 |
| D594,937 S * | 6/2009 | Price | F16B 33/006 D23/259 |
| D600,546 S * | 9/2009 | Scilingo | F16B 33/006 D8/397 |
| 8,137,042 B2 * | 3/2012 | Severns | F16B 5/0275 411/387.1 |
| 2002/0180207 A1 * | 12/2002 | Kanner | F16L 9/00 285/3 |
| 2003/0198528 A1 * | 10/2003 | Onishi | F16B 31/021 411/2 |
| 2004/0136801 A1 * | 7/2004 | Schneider | F16B 33/006 411/3 |
| 2006/0039772 A1 * | 2/2006 | Matthys-Mark | A61B 17/8057 411/5 |
| 2009/0030443 A1 * | 1/2009 | Buser | A61B 17/3423 606/185 |
| 2010/0098514 A1 * | 4/2010 | Silva | F16B 37/0828 411/427 |
| 2010/0253065 A1 * | 10/2010 | Lotti | F16L 33/227 285/3 |
| 2011/0138592 A1 * | 6/2011 | Tedeschi | E05D 5/121 29/11 |
| 2012/0117784 A1 * | 5/2012 | Collin | F16L 19/0206 29/525.02 |
| 2012/0207563 A1 * | 8/2012 | Schaeffer | F16B 33/008 411/3 |
| 2012/0266446 A1 * | 10/2012 | Leibfried | A47K 13/26 29/525.02 |
| 2014/0123819 A1 * | 5/2014 | Beemer et al. | B25B 23/142 81/476 |

* cited by examiner

PLUMBING CONNECTOR

RELATED APPLICATIONS

This application claims, under 35 U.S.C. §119, the benefit of provisional application No. 62/010,376 filed Jun. 10, 2014 entitled "Plumbing Connector" the contents of which are hereby incorporated by reference in their entirety.

TECHNICAL FIELD

The disclosure herein relates to the field of connectors, and more specifically to the field of plumbing connections between a water supply hose (also commonly referred to as a water supply input hose, a toilet tank house, a toilet line, etc.) and a toilet. Aspects of the disclosure relate to preventing a connector from being over-torqued by a user or otherwise.

BACKGROUND

Plumbing connectors such as, for example, a toilet water line connector are used by plumbers, home owners, and tenants to connect a toilet water input hose to the toilet enabling water to flow from the water supply valve to the toilet without leaking water. Particularly, a plumbing connector is connected to the toilet water input hose by, for example, a pneumatic crimp, a threaded engagement, or the like. Additionally, the plumbing connector is connected to the toilet by, for example, a threaded engagement between the plumbing connector and the toilet.

A plumbing connector is often sold already connected to an outlet portion of the toilet water input hose. During installation of the plumbing connector, a user connects the hose to the toilet by screwing the plumbing connector onto a mating connector of the toilet (e.g., a water refill valve located at the base of the tank of the toilet) to form a finger-tight, compression-fit, connection. In some instances, a user may over-tighten (e.g., over-torque) the plumbing connector, which may eventually cause the plumbing connector to crack, break, deform and/or otherwise fail. In such instances, when the water supply valve is in an "on" configuration, the plumbing connector may begin to leak water via the crack or deformation and may potentially cause water damage to the area surrounding the toilet. If the leak goes undetected for a long period time, the amount of water damage may be severe.

BRIEF SUMMARY

The present disclosure contemplates a plumbing connector that prevents (or ameliorates) over-torqueing of the plumbing connector by a user. The following presents a simplified summary of the disclosure in order to provide a basic understanding of some aspects. It is not intended to identify key or critical elements of the invention or to delineate the scope of the invention. The following summary merely presents some concepts of the disclosure in a simplified form as a prelude to the more detailed description provided below.

In an illustrative embodiment, a plumbing connector (e.g., a connector pneumatically coupled to an outlet portion of a toilet water input hose) may have multiple flanges radially extending therefrom. One or more of the flanges may each define at least one pyramidal recess or slot thereby reducing the cross-sectional area of a portion of each of the one or more flanges. Thus, if a user applies a rotational force (e.g., a torque) above a predetermined threshold value while screwing on the plumbing connector, the one or more flanges may deform and eventually separate (e.g., break away) from the plumbing connector at the reduced cross-sectional area portions of the one or more flanges. As a result, the rotational force (e.g., the torque) applied by the user may be disengaged from the plumbing connector to prevent over-tightening (e.g., over-torqueing) of the plumbing connector to the toilet. Accordingly, because the user is prevented from over-tightening the plumbing connecter, the plumbing connector might not crack, break, deform and/or otherwise fail.

BRIEF DESCRIPTION OF THE DRAWINGS

The present disclosure is illustrated by way of example and not limited in the accompanying figures.

DETAILED DESCRIPTION OF THE INVENTION

In the following description of the various examples and components of this disclosure, reference is made to the accompanying drawings, which form a part hereof, and in which are shown by way of illustration various example structures and environments in which aspects of the invention may be practiced. It is to be understood that other structures and environments may be utilized and that structural and functional modifications may be made from the specifically described structures and methods without departing from the scope of the present invention.

Also, while the terms "upper," "lower," "top," "bottom," "front," "back," "rear," "side," "forward," "rearward," and "backward" and the like may be used in this specification to describe various example features and elements of the invention, these terms are used herein as a matter of convenience, e.g., based on the example orientations shown in the figures and/or the orientations in typical use. Nothing in this specification should be construed as requiring a specific three dimensional or spatial orientation of structures in order to fall within the scope of the invention.

Figure 1:
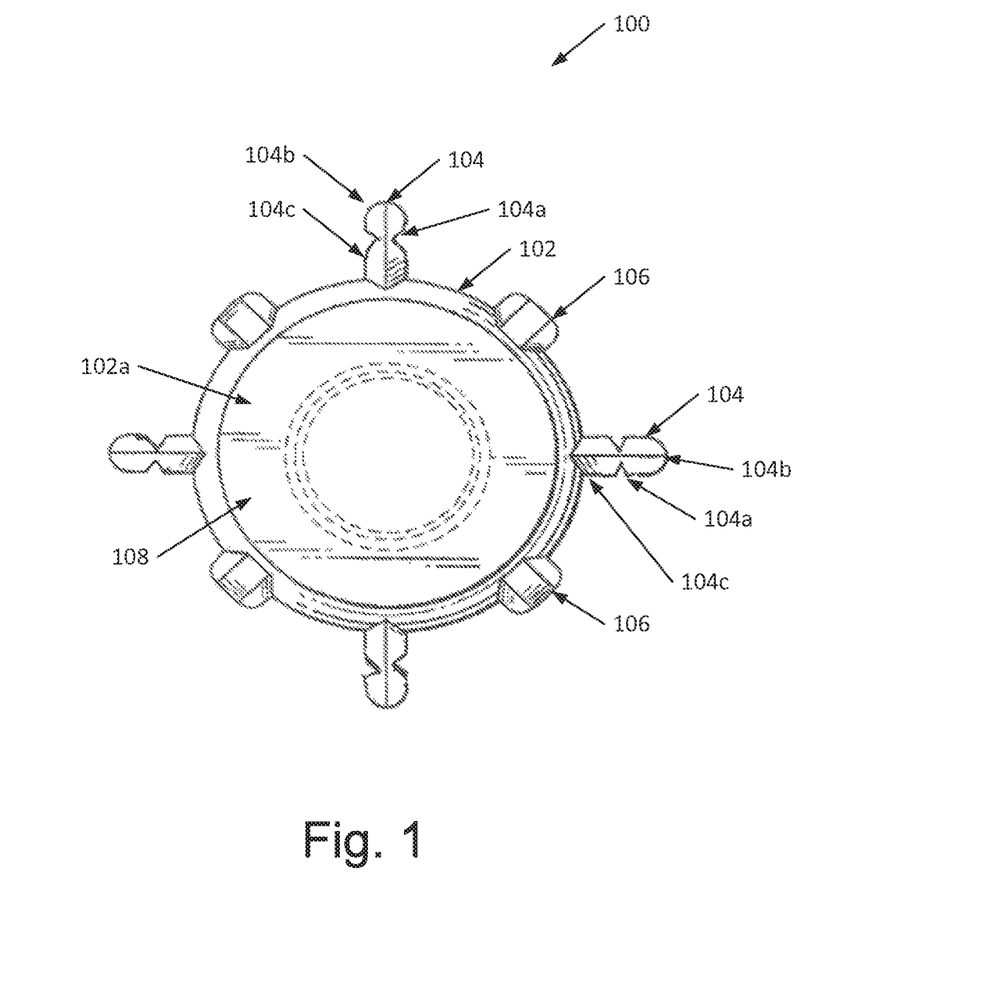
FIG. 1 shows a top view of an illustrative embodiment of a plumbing connector.
Figure 2:
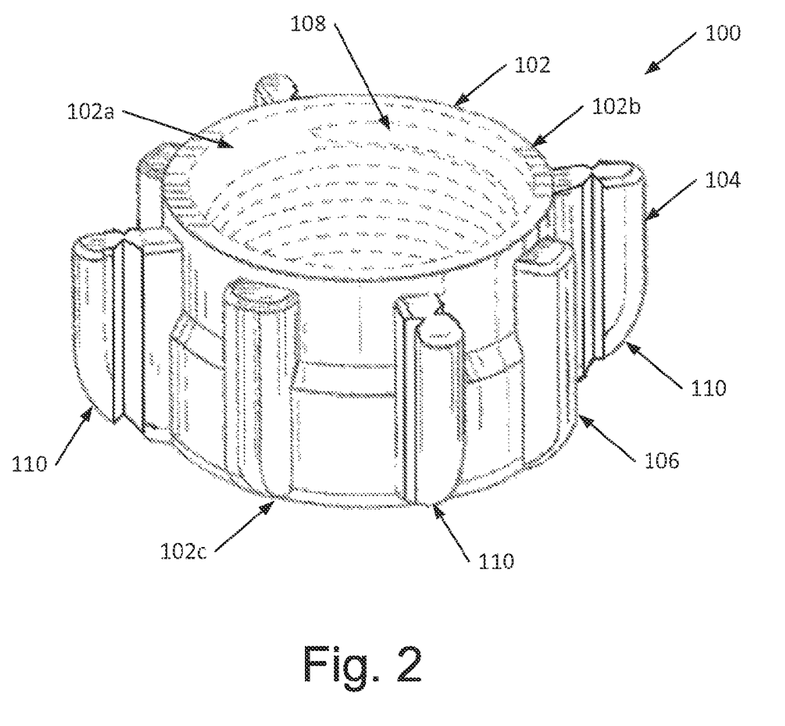
FIG. 2 shows a side perspective view of an illustrative embodiment of a plumbing connector.
Figure 3:
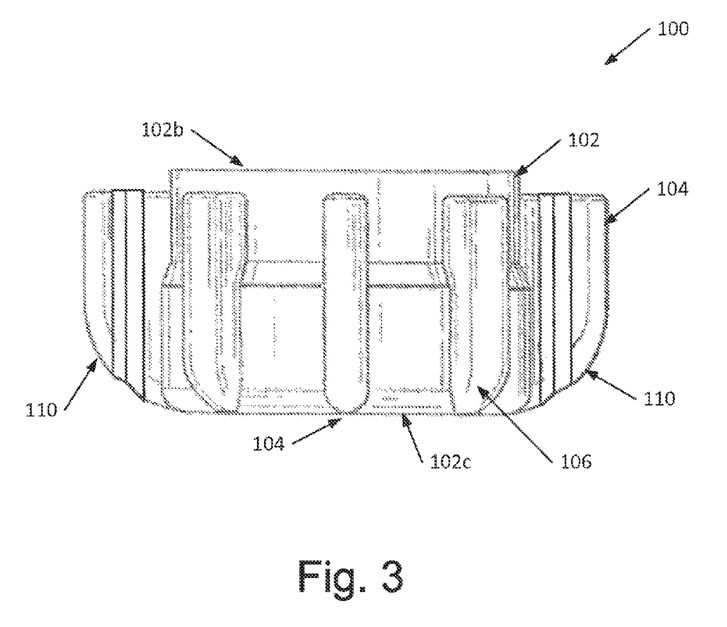
FIG. 3 shows a side view of an illustrative embodiment of a plumbing connector.

FIGS. 1-3 respectively depict a top view, a side perspective view, and a side view of an illustrative embodiment of a plumbing connector 100. The plumbing connector 100 may comprise a circular body 102 having one or more elongated flanges 104 and one or more short flanges 106 extending radially outward from the circular body 102. Although FIGS. 1-3 illustrate elongated flanges 104 in one particular arrangement/pattern, this disclosure is not so limited. Rather, this disclosure contemplates elongated flanges 104 (or comparable mechanisms) configured in varying arrangements, such as an increased number of elongated flanges 104 or elongated flanges 104 strategically placed around the perimeter of the plumbing connector 100.

The circular body 102 may define a hollow passageway 102a (e.g., an opening, hole, aperture, channel, or the like)

configured to receive a mating (e.g., male) connection section of a toilet (e.g., a water refill valve located at the base of the tank of the toilet). Specifically, an interior surface 108 of the circular body 102 may be threaded (shown in FIG. 2) to form a mating (e.g., female) connection section for use in a threaded engagement with a mating (e.g., male) connection section of the toilet (not shown). In alternative embodiments, the circular body 102 may define a mating (e.g., a male) connection section for use in a threaded engagement with a mating (e.g., a female) connection section of the toilet. Additionally, the circular body 102 may also be configured to transport water there-through.

The multiple elongated flanges 104 radially extending outward from the circular body 102 may each define one or more recesses to reduce a width of a portion of each of the elongated flanges 104 (also referred to herein as a reduced-width portion or middle portion 104a of each of the multiple elongated flanges 104). In some embodiments, the recesses may be symmetrically defined on each of the elongated flanges 104. For example, a first recess may be defined by a first side of an elongated flange 104 and a second recess may be defined by a second side of the elongated flange 104 such that the first recess and the second recess are symmetric to one another with respect to the elongated flange 104. Additionally or alternatively, in some embodiments, one or more of the recesses might not be symmetric to one or more other recesses. The elongated flange 104 may include a proximate portion 104c, a distal portion or end portion 104b opposite the proximate portion 104c, and the reduced-width portion (or middle portion) 104a in between the proximate portion 104c and the distal portion 104b.

Figure 4:
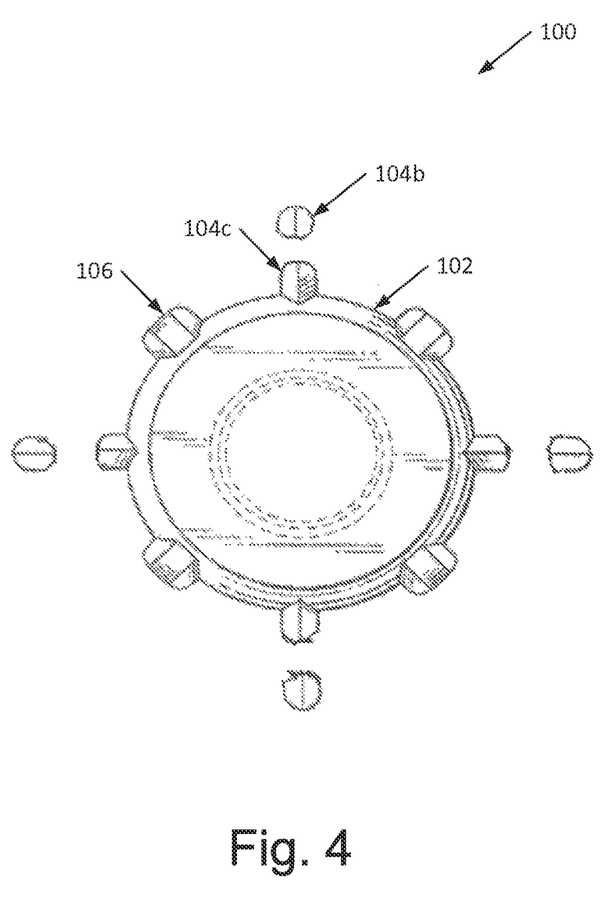
FIG. 4 shows a top view of an illustrative embodiment of a plumbing connector in a separated configuration.

The reduced-width portion 104a of each of the elongated flanges 104 may be configured to break when a user (e.g., an installer of a toilet water input hose) applies a rotational force (e.g., a torque) above a predetermined threshold value to the multiple elongated flanges 104. As a result, the end portion (or distal portion) 104b of the elongated flanges 104 may separate (e.g., break away) from the proximate portion 104c of the elongated flanges 104 and the circular body 102 as shown in FIG. 4.

The rotational force (e.g., the torque) above the predetermined threshold value may be less than an amount of force to break the other portions (e.g., end portion 104b, proximate portion 104c, etc.) of the elongated flanges 104 and may be less than an amount of force to break standard width flanges in the plumbing industry. For example, because the width of the proximate portion 104c is greater than the width of the reduced-width portion 104a, the reduced-width portion 104a may be easier to break than the proximate portion 104c. For example, because the standard width for a flange of a plumbing connector in the plumbing industry is greater than the width of the reduced-width portion 104a, the reduced-width portion 104a may be easier to break than the standard width flange. The predetermined threshold value may vary based on the type of material used to construct or form the plumbing connector 100. In some embodiments, the material may be polyamide-66 (PA66) nylon with a 30% glass filling, plastic, polyvinyl chloride (PVC), copper, or the like.

While the recesses defined by the elongated flanges 104 are illustrated as being triangular (e.g., pyramidal) in shape, the recesses may be any number of shapes including, for example, ovular, rectangular, square, circular, or any combination thereof. For example, the recesses defined by the elongated flanges 104 may form a substantially rectangular slot in the elongated flanges 104. In some embodiments, the reduced-width portion 104a of the elongated flanges 104 may be perforated. For example, the reduced-width portion 104a may define multiple holes to further reduce the cross-sectional area of the reduced-width portions 104a so that the elongated flanges 104 may be more easily broken when force above the predetermined threshold is applied to the elongated flanges 104.

As noted above, the elongated flanges 104 are configured to break and/or otherwise separate from the circular body 102 when a user applies a force (e.g., a torque) above a predetermined threshold value. As a result, if the user attempts to screw the plumbing connector 100 onto the toilet too tightly via the user's hand or a tool (e.g., pliers, wrench, or the like), then the elongated flanges 104 will break resulting in the user's hand or tool being disengaged from the plumbing connector 100. Accordingly, because the user is disengaged from (e.g., no longer in direct, fixed contact with) the plumbing connector 100 when the user applies force above the predetermined threshold value to the elongated flanges 104, the user is prevented from over-tightening (e.g., over-torqueing) the plumbing connector 100 and, thus, the plumbing connector 100 might not crack, break, deform and/or otherwise fail.

While numerous examples reference breaking/separation of an end portion or distal portion 104b of the elongated flange 104 from the proximate portion 104c, this disclosure also contemplates various embodiments wherein the end portion 104b of the elongated flange 104 remains in contact with (i.e., does not separate from) the proximate portion 104c and remains intact with the elongated flange 104. Rather, the end portion 104b and the proximate portion 104c of the elongated flange 104 may pivot along a shared axis. In an embodiment when the end portion 104b and the proximate portion 104c pivot along a shared axis, and a rotational force is applied above a predetermined threshold, the end portion 104b and the proximate portion 104c may pivot, rotate, and/or bend and cause a user's hand or tool becomes disengaged. For example, the user's hand or tool may become disengaged from the plumbing connector 100 if the user attempts to screw it on too tightly.

The breaking of the elongated flanges 104 may also indicate and/or otherwise inform the user that the user has attempted to over-tighten the plumbing connector 100 and that the user should not attempt to continue to tighten the plumbing connector 100. For example, a user manual associated with the plumbing connector may illustrate such information.

As shown in FIGS. 2 and 3, the circular body 102 may be elongated to form a substantially cylindrical shape. The flanges 104 and 106 may extend from a top portion 102b of the circular body 102 to a bottom portion 102c of the circular body 102. The flanges 104 and 106 may be unitarily formed with the circular body 102 and may help provide structural support and rigidity to the circular body 102.

The bottom portion 102c of the circular body 102 may be configured to receive and couple to an outlet portion of a toilet water input hose (not shown). The bottom portion 102c of the circular body 102 may be coupled to the toilet water input hose via a pneumatic coupling (e.g., an 8-sided pneumatic crimp), a threaded coupling, or the like. In some embodiments, once the plumbing connector 100 is coupled to the toilet water input hose, the plumbing connector 100 may rotate with respect to the toilet water input hose without causing decoupling of the plumbing connector 100 from the toilet water input hose. An inlet portion of the toilet water input hose may be configured to couple to a water supply valve (e.g., a quarter turn ball valve, a multi-turn valve, etc.).

Figure 5:
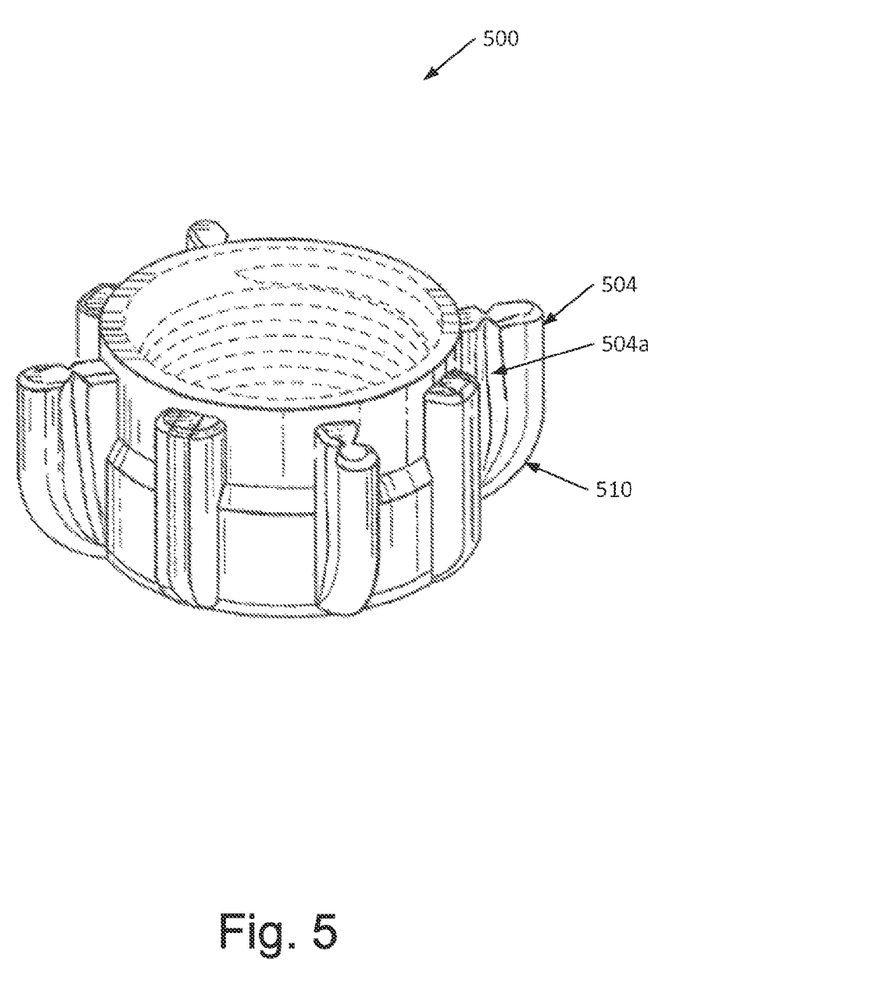
FIG. 5 shows a side perspective view of an illustrative embodiment of a plumbing connector.
Figure 6:
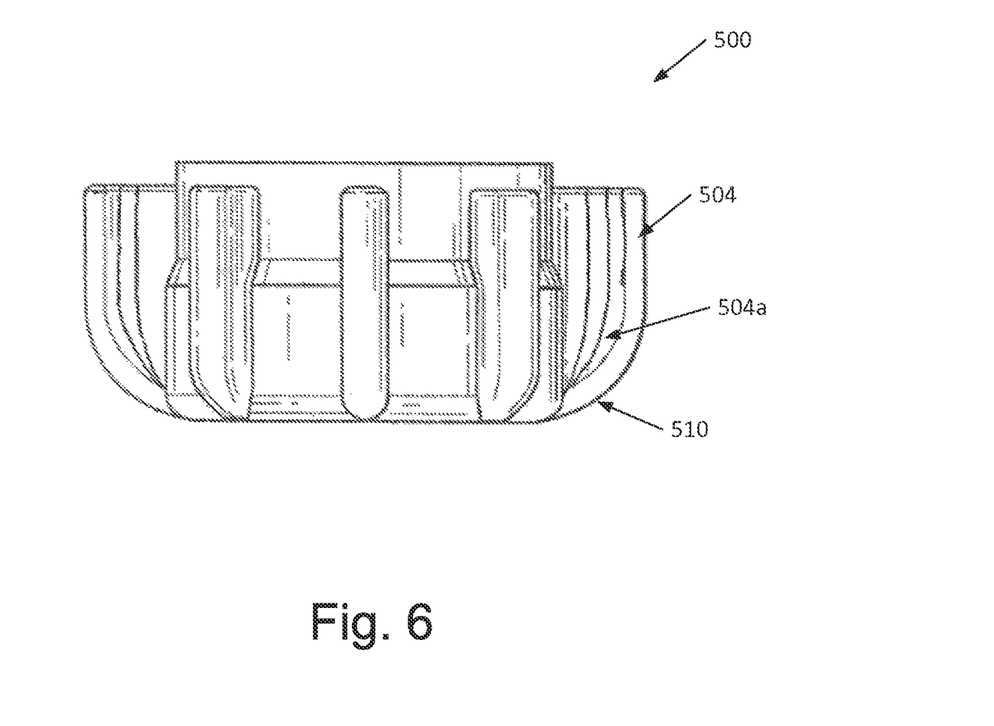
FIG. 6 shows a side view of an illustrative embodiment of a plumbing connector.

As shown in FIGS. 2 and 3, the reduced width portion 104a may define an axis that extends along a portion of the length of the elongated flange 104 irrespective of whether the elongated flange 104 has a curved edge portion 110. Alternatively, in some embodiments, the reduced width portion may slightly curve as the elongate flange curves as shown in FIGS. 5 and 6. For example, plumbing connector 500 may include multiple elongated flanges 504 that may each include a reduced-width portion 504a. The reduced-width portion 504a may curve as the elongated flange 504 curves along a curved edge portion 510.

Although various examples throughout this disclosure reference a toilet being fitted to with a novel plumbing connector configured with one or more flanges that may deform and eventually separate from the plumbing connector, the disclosure is not so limited. For example, the disclosure contemplates that the novel connector with the aforementioned one or more flanges may be used in other applications, both plumbing and non-plumbing, where prevention (or amelioration) of over-tightening is a concern.

Aspects of the invention have been described in terms of illustrative embodiments thereof. Numerous other embodiments, modifications and variations within the scope and spirit of the disclosed invention will occur to persons of ordinary skill in the art from a review of this entire disclosure. For example, one of ordinary skill in the art will appreciate that the steps illustrated in the illustrative figures may be performed in other than the recited order, and that one or more steps illustrated may be optional in accordance with aspects of the disclosure.

What is claimed is:

1. A plumbing connector comprising: a cylindrical body including a plurality of flanges radially extending from an outer surface of the cylindrical body, wherein at least one flange of the plurality of flanges includes a recess such that the at least one flange is configured to break at the recess when a rotational force above a predetermined threshold is applied to the at least one flange to prevent over-tightening the plumbing connector to a toilet.

2. The plumbing connector of claim 1, wherein the recess is a first recess defined by a first side of the at least one flange, wherein the at least one flange has a second side defining a second recess different from the first recess.

3. The plumbing connector of claim 2, wherein the first recess is symmetric to the second recess.

4. The plumbing connector of claim 2, wherein the first recess and the second recess are each substantially pyramidal in shape.

5. The plumbing connector of claim 2, wherein the first recess and the second recess are each substantially rectangular in shape.

6. The plumbing connector of claim 1, wherein one or more of the flanges extend from a top portion of the cylindrical body to a bottom portion of the cylindrical body.

7. The plumbing connector of claim 1, wherein an inner surface of the cylindrical body is threaded for use in a threaded engagement with a mating male connection component of the toilet, wherein a bottom portion of the cylindrical body is pneumatically coupled to a hose.

8. A kit comprising: a hose; and a plumbing connector pneumatically coupled to the hose, wherein the plumbing connector includes one or more flanges extending radially from the plumbing connector, wherein each of the one or more flanges includes a proximate portion, a distal portion opposite the proximate portion, and a middle portion in between the proximate portion and the distal portion, wherein the middle portion has a width less than a width of the proximate portion and less than a width of the distal portion.

9. The kit of claim 8, wherein the middle portion is configured to break to disconnect the distal portion from the plumbing connector when a rotational force above a predetermined threshold is applied to the one or more flanges to prevent over-tightening of the plumbing connector to a toilet.

10. The kit of claim 8, wherein the middle portion is configured to indicate to a user that the user is attempting to over-torque the plumbing connector by being configured to break when a rotational force above a predetermined threshold is applied to the one or more flanges.

11. The kit of claim 10, wherein the middle portion defines a plurality of apertures.

12. The kit of claim 8, wherein the middle portion defines a plurality of symmetric pyramidal recesses.

13. The kit of claim 8, wherein the middle portion is configured to break to disconnect the distal portion from the plumbing connector when a rotational force is applied to the one or more flanges that is less than a rotational force to break the proximate portion.

14. The kit of claim 8, wherein the plumbing connector is configured to be coupled to a toilet via a threaded engagement.

15. An apparatus comprising: a cylindrical body having a closed channel extending from a first end portion to a second end portion, wherein the first end portion is threaded to receive a mating male connection of a toilet, wherein the second end portion is configured to be coupled to a hose; and a plurality of flanges extending radially outward from the cylindrical body and configured to disengage a user from the cylindrical body when the user applies a torque above a predetermined threshold to prevent the cylindrical body from being over-torqued onto the mating male connection of the toilet, wherein each flange of the plurality of flanges is configured to break at a reduced-width portion of the respective flange.

16. The apparatus of claim 15, wherein each flange of the plurality of flanges has a first pyramidal recess and a second pyramidal recess that is symmetric to the first pyramidal recess.

17. The apparatus of claim 15, wherein each flange of the plurality of flanges has a rectangular recess at which the flange is configured to break when the user applies the torque above the predetermined threshold.

18. The apparatus of claim 15, further comprising: a plurality of support flanges extending radially outward from the cylindrical body and configured to provide structural support to the cylindrical body.

19. The apparatus of claim 18, wherein a length of each flange of the plurality of flanges is greater than a length of each support flange of the plurality of support flanges.

* * * * *